G. N. SAEGMULLER & G. A. H. KELLNER.
COMBINED PERISCOPE AND RANGE FINDER.
APPLICATION FILED DEC. 16, 1914.
1,208,216.
Patented Dec. 12, 1916.
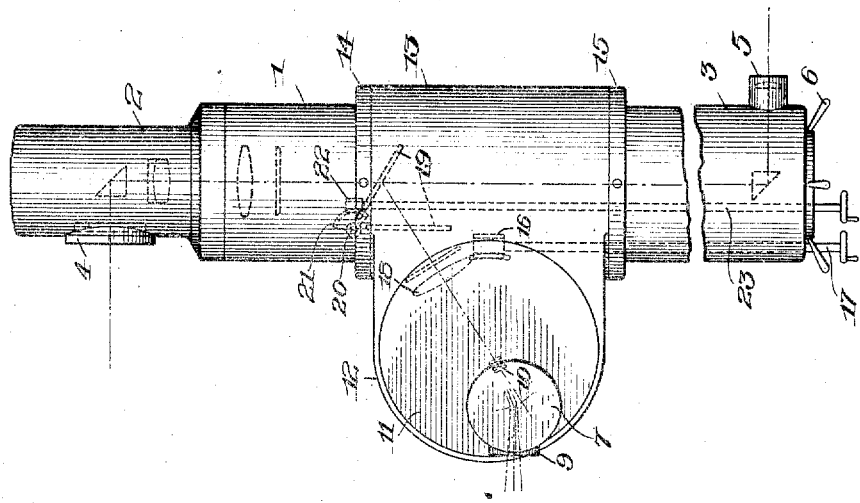
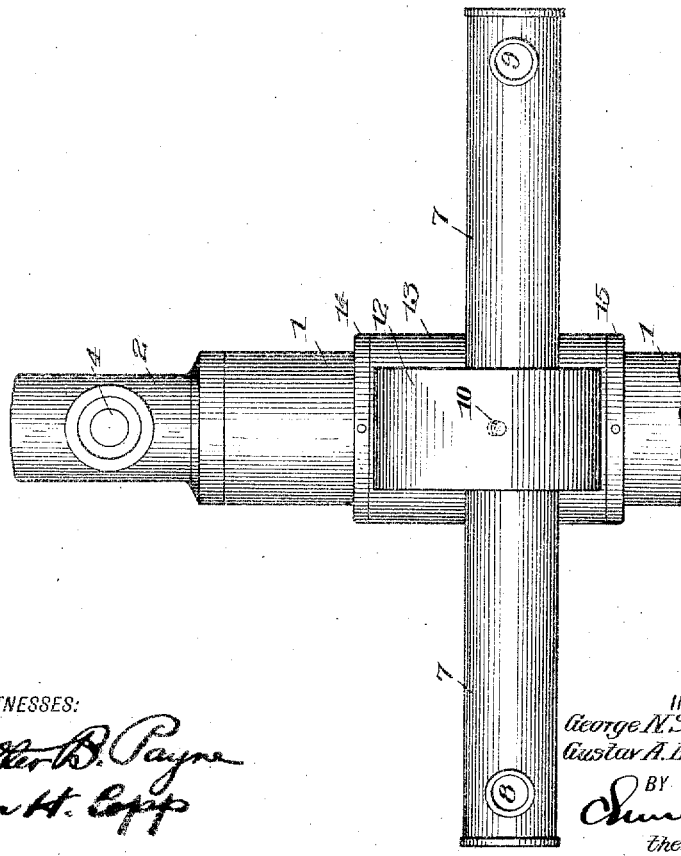
WITNESSES:
Walter B. Payne
Nelson H. Copp
INVENTORS
George N. Saegmuller
Gustav A. Hermann Kellner
BY
their ATTORNEYS

UNITED STATES PATENT OFFICE.

GEORGE N. SAEGMULLER AND GUSTAV A. HERMANN KELLNER, OF ROCHESTER, NEW YORK, ASSIGNORS TO BAUSCH & LOMB OPTICAL CO., OF ROCHESTER, NEW YORK, A CORPORATION OF NEW YORK.

COMBINED PERISCOPE AND RANGE-FINDER.

1,208,216.      Specification of Letters Patent.      Patented Dec. 12, 1916.

Application filed December 16, 1914. Serial No. 877,467.

*To all whom it may concern:*

Be it known that we, GEORGE N. SAEGMULLER and GUSTAV A. HERMANN KELLNER, both of Rochester, in the county of Monroe and State of New York, have invented certain new and useful Improvements in Combined Periscopes and Range-Finders; and we do hereby declare the following to be a full, clear, and exact description of the same, reference being had to the accompanying drawings, forming a part of this specification, and to the reference-numerals marked thereon.

Our present invention has for its object to provide an optical instrument adapted particularly to be used in conjunction with underwater craft or submarines which shall comprise a system of optical elements forming a periscope which can be used for general observation and another system of optical elements forming a range finder for more specific observations by means of which relative distances may be determined.

Our invention has for its further object to so arrange the respective systems of elements that the eyepiece or ocular of the periscope will also serve as the means of reading the observations appearing in the range finder, this end being obtained by the interposing of a movable reflecting element which may be adjusted to direct the rays of light which pass through the range finder into the axis of the periscope.

To these and other ends the invention consists in certain improvements and combinations of parts all as will be hereinafter more fully described, the novel features being pointed out in the claims at the end of the specification.

In the drawings: Figure 1 is a front view of a head portion of an optical instrument constructed in accordance with our present invention, and Fig. 2 is a side elevation thereof.

Similar reference characters in the several figures indicate the same parts.

In illustrating one embodiment of our invention we have shown a periscope comprising the tube 1 which it will be understood may be of any desired length, and projects vertically from the craft upon which it is mounted, its upper end or head 2 being exposed while its lower end 3 is positioned for convenient access to the operator within the conning tower of the vessel, parts of the latter however not being indicated. The tube 1 contains the periscopic system of optical elements comprising generally the objective 4 at the forward side of the head 2, the internal system of lenses and reflectors, as shown in dotted lines, and the eyepiece or ocular 5 at the lower end of the tube 1. The latter, it will be understood, is mounted for rotative adjustment so that the complete horizon may be scanned, the rotation of the tube being controlled by the hand wheel 6.

The range finder is mounted on the upper end of the tube or shell of the periscope preferably in proximity to and only a short distance below the periscope objective 4, and is disposed with the axis of its optical elements in a horizontal plane so that they intersect at right angles the plane of the axis of the periscopic lens system. The range finder, as indicated by the horizontally disposed tube 7, which is positioned in front of the tube 1, and carries at its ends the two objectives 8 and 9, contains any preferred arrangement of lenses, reflecting surfaces and scales, by means of which a coincidence of the images formed by the two objectives may be effected, and the distance of the object sighted determined.

The internal parts of the range finder have not been indicated with the exception of the centrally disposed ocular or eyepiece 10, shown in dotted lines, which is disposed in the plane of the axis of the periscope.

The field of the range finder is smaller than that of the periscope because it has a higher magnification, and in order therefore to position the image of the object sighted in the center of the field of the ocular 5 of the periscope we provide an altitude adjustment of the range finder, as will be further described. To accomplish this, the range finder is mounted to swing bodily in an arc described about the center of the exit pupil of its eyepiece 10. One means of providing for this adjustment is to mount the range finder tube 7 eccentrically in a circular carrier or head 11, the center of which is coincident with said exit pupil. The carrier 11 may be journaled in the bearing 12 of the sleeve 13, rigidly secured on the periscope tube 1 and rotated to change the altitude of the field of observation of the objectives 8 and 9 by means of a worm 16 which may be adjusted by the operator by the rotation of a shaft 17 journaled in the tube 1. The worm 16 meshes with rack teeth 16ª on the head 11 and upon the rotation of the worm the head is turned, or tilted, in its bearing 12 to raise or lower the objectives 8 and 9 bodily. A collective lens 18 is also disposed in the axis of the eyepiece lenses 10, and coöperates with parts of the optical elements of the periscope to form the image appearing at said exit pupil in the eyepiece of the periscope. Coöperating with the collective lens is a reflector, preferably in the form of a mirror 19, shown in dotted lines in Fig. 2, which is supported upon a suitable frame adjustable about the pivot 20, so that it may be moved into and out of the optical axis of the periscope. The adjustment of this reflector may be accomplished by a suitable mechanism such as a segmental gear 21 and a coöperating worm 22 on the shaft 23, the lower end of which is provided with a hand wheel located in a convenient position for the operator.

In a combined instrument of this character we prefer to employ an arrangement of optical elements in the range finder such as shown in United States Letters Patent No. 940,137, issued to Otto Eppenstein for coincidence telemeter, November 16, 1909 in which the coincidence of the two images is obtained by rotating the range finder in azimuth without requiring the adjustment of the usual measuring wedge, and in this type of range finder it will be understood that the range is determined in the usual manner by the coöperation of the images with the scale bar.

We claim as our invention:

1. An optical instrument comprising two systems of optical elements, one arranged to form a periscope and the other arranged to form a range finder, located with its axis in a plane intersecting that of the periscope, a reflector arranged to receive light rays from the range finder system and direct them into the axis of the periscope system.

2. A combined periscope and range finder, each comprising the usual complement of objective and ocular lenses, said instruments being disposed so that the optical axis of one intersects the axis of the other and means embodying a reflector disposed to coöperate with the two oculars to enable the observer at the eyepiece of the periscope to observe the images formed in the eyepiece of the range finder.

3. In an optical instrument, the combination with a system of vertically disposed periscope optical elements and a system of horizontally disposed range finder optical elements, the latter being located at one side of the axis of the former, of a reflector adjustably mounted relatively to the two systems and serving to direct light rays from the range finder system into the axis of the periscopic system.

4. In an optical instrument, the combination with a system of periscope optical elements, and a system of range finder optical elements, the latter being disposed at one side of and at an angle intersecting the plane of the axis of the former, of a collective lens and a reflector coöperating with the range finder system and a portion of the periscopic system to render the images formed by the range finder system visible in the ocular of the periscopic system.

5. In an optical instrument, the combination with a system of periscope optical elements comprising an ocular, and a system of range finder optical elements also comprising an ocular, the latter system being disposed with its axis in a plane intersecting that of the periscopic system, of means for adjusting the range finder system for altitude about the center of the exit pupil of its ocular, and an adjustable reflector coöperating with the latter to render images formed therein visible in the ocular of the periscope.

GEORGE N. SAEGMULLER.
GUSTAV A. HERMANN KELLNER.

Witnesses:
WILLIAM G. WOODWORTH,
HENRY C. THOM.